United States Patent [19]

Mercer et al.

[11] Patent Number: 4,563,358

[45] Date of Patent: Jan. 7, 1986

[54] COMPOSITE FOOD PRODUCT AND METHOD FOR MAKING THE SAME

[75] Inventors: Frank B. Mercer, Blackburn; Maurice S. Jeffery, West Midlands; Keith F. Martin, Whalley, all of England

[73] Assignees: F. B. Mercer Limited, Blackburn; Cadbury Schweppes Limited, London, both of England

[21] Appl. No.: 7,597

[22] Filed: Jan. 29, 1979

[51] Int. Cl.⁴ .......................... A23L 1/00; A23L 1/08; D04H 3/16

[52] U.S. Cl. ..................................... 426/89; 426/284; 426/306; 426/618; 426/438; 426/559; 426/625; 426/445; 426/514; 426/516; 426/94; 264/176 F; 156/433; 156/167

[58] Field of Search .................. 426/89, 283, 93, 104, 426/559, 560, 621, 625, 445, 448, 452, 514, 516, 517, 662, 808, 306, 302, 281, 307, 391, 103, 139, 618, 138, 438, 284; D1/1-23; 264/DIG. 81, 176 F, 177 F, 202; 156/167, 433

[56] References Cited

U.S. PATENT DOCUMENTS

| | | | |
|---|---|---|---|
| D. 205,027 | 6/1966 | Scharschmidt | D1/11 |
| D. 212,580 | 11/1968 | Sautier | D1/11 |
| 462,990 | 11/1891 | Oppenheimer | D1/12 |
| 1,265,853 | 5/1918 | Wiseman | 425/315 |
| 1,484,016 | 2/1924 | Fisher | 426/138 |
| 2,564,049 | 8/1951 | Bevington | 426/139 |
| 2,640,033 | 5/1953 | Marshall | 426/516 |
| 2,858,219 | 10/1958 | Benson | 426/516 |
| 3,407,070 | 10/1968 | Murray et al. | 426/808 |
| 3,480,445 | 11/1969 | Slaybaugh | 426/284 |
| 3,615,675 | 10/1971 | Wisdom et al. | 426/284 |
| 3,674,506 | 7/1972 | Schilling et al. | 426/284 |
| 3,732,113 | 5/1973 | Walters | 426/284 |
| 3,867,559 | 2/1975 | Haas | 426/138 |
| 3,894,159 | 7/1975 | Franta | 426/284 |
| 3,958,018 | 5/1976 | Tay | 426/660 |

FOREIGN PATENT DOCUMENTS

| | | | |
|---|---|---|---|
| 836555 | 6/1960 | United Kingdom | 426/540 |
| 969655 | 10/1964 | United Kingdom | |

*Primary Examiner*—Raymond Jones
*Assistant Examiner*—Elizabeth A. King
*Attorney, Agent, or Firm*—Holman & Stern

[57] ABSTRACT

An edible composition comprises an integrally extruded net formed of an edible material e.g. a cereal-based, sugar-based or fat-based material. The composition has a novel appearance and unexpectedly good eating qualities. The net may be tubular planar or curved and may be filled and/or coated with a compatible edible material.

In the case of a tubular filled net, the net is preferably produced by extending the edible net-forming material through a pair of relatively rotating or oscillating dies having mutually engaging grooved surfaces. When the grooves in one die mate with the grooves in the other die, integral joints between individual strands in the net are formed. When the grooves in one die are separated from the grooves in the other die, the individual strands are formed. A center-filling, which may support the extruded net, is extruded through the center of the net-forming die arrangement to provide a center filling to the tube.

38 Claims, 10 Drawing Figures

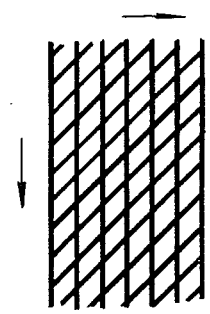 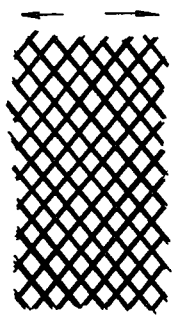 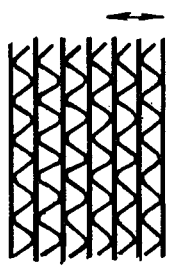
FIG.1.   FIG.2.   FIG.3.
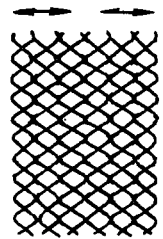 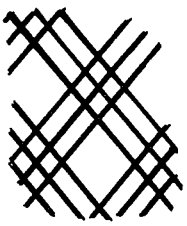 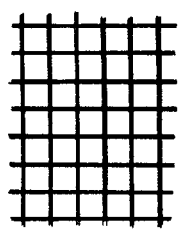
FIG.4.   FIG.5.   FIG.6.
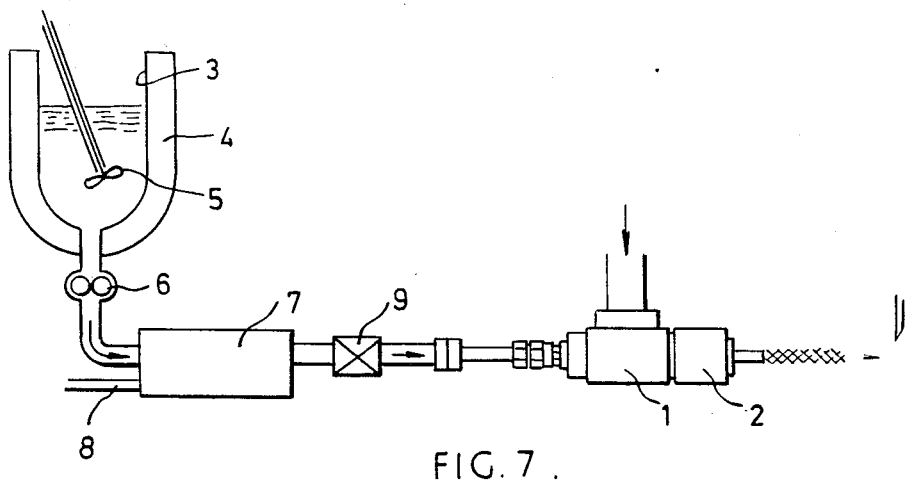
FIG.7.

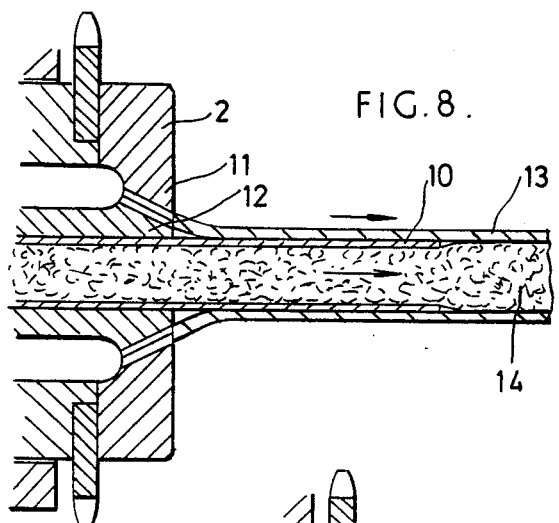
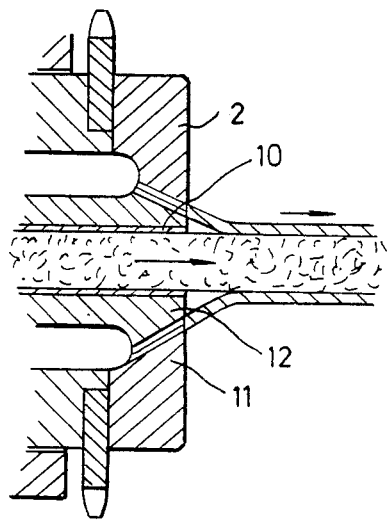
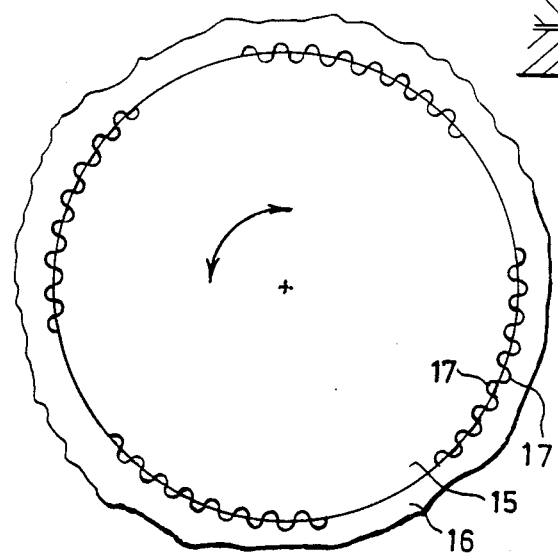

COMPOSITE FOOD PRODUCT AND METHOD FOR MAKING THE SAME

The present invention, in one of its aspects, provides a food product which comprises an integrally extruded net made of an edible material.

The present invention, in another of its aspects, provides a method of making an edible food product, comprising integrally extruding a net made of an edible material.

The present invention, in a further aspect, provides apparatus for making an edible food product in the form of a tube with a filling within the tube, the apparatus comprising an extrusion head for integrally extruding a tubular net of edible material, the extrusion head having two relatively rotatable or oscillatable annular dies each of which has a ring of extrusion die orifices which are inclined towards the axis of the dies, and a duct passing through the centre of the extrusion head for feeding an edible filling axially of the dies in the direction of extrusion as the net is extruded.

The use of the net gives the food product a new texture and can give it a novel appearance or decorative effect. Furthermore, the net can enable the flavour of the food product to be detected more quickly in the mouth. In addition, the net can provide an economical sheath for covering a greasy or sticky filling which is not easily held in the fingers.

In general, an integrally extruded net has a plurality of strands which extend right through the net, strands being connected by tenacious joins where they cross over one another or intersect or touch one another.

The net may be of flat or tubular form or it may be of curved or trough shape. Thus the net can be formed by feeding the extrudible material through die orifices defined between a pair of die members of which at least one is linearly reciprocatable relative to the other in order to produce a planar net—the dies may be as described in FIGS. 1 to 10 of British Patent Specification No. 969 655 or FIGS. 7 and 8 of British Patent Specification No. 836 555. An alternative procedure is to use relatively oscillatable die members of circular or annular shape with the co-operating die orifices in spaced groups around the die members, each group producing a separate strip of net. The planar net produced may then be subjected to a subsequent deforming operation to impart a curved or more curved or trough shape thereto.

The edible net may constitute the whole of the food product or it may form only part of a composite food product including one or more other edible components. For example, the net may be coated with a food such as chocolate, a chocolate-like coating, a fat-based coating or a fondant.

The net is preferably substantially rigid and, if one or more other edible components are present, can act as a support for the other edible component(s).

The other edible component, when present and when the net is tubular, can be filled into the centre of a net tube, to act in some cases as a support for the net tube as well as adding edible appeal. The net can have a filling of one edible component and a coating of another edible component.

The net may consist of any one or more of many food or confectionery materials including, for example, cereal bases, e.g. maize, oats, rice, wheat, potato, millet, modified starches and proteinaceous materials, e.g. edible soya, cotton seed protein, ground nut protein and wheat gluten.

For cereal bases, used to form the net, the normally preferred method of producing the base is that using a cook extruder—cook extruders are well known. In this the previously moisture-controlled cereal material is extruded under high pressure and high temperature through a die and as it leaves the die, rapid evaporation of moisture takes place to produce a "puffed" product.

Normally cook extruders produce an extruded product which still retains a high moisture content of approximately 10% w/w, which then requires drying down to a level of approximately 2% w/w. If the net contains a filling such as a fat-based filling with a low heat stability, such drying is impracticable. Thus, preferably, the moisture content of the net shortly after extrusion is such that no substantial drying is subsequently required, and is, for instance, approximately 2% w/w. However, a moisture content of 2 to 8% w/w is possible depending upon the nature of the product, a moisture content of 4 to 8% w/w is considered suitable for an extruded product having the biscuit-like consistency. This can be achieved if the net is extruded at high temperature and/or high pressure, for instance, at a temperature substantially above 100° C., for example about 200° C., and at a pressure of for example 200–300 pounds per square inch (p.s.i) (about 0.15–0.2 Kg/mm$^2$). The use of a temperature in the range of 200° C. to 300° C. at rather lower pressures, e.g. a temperature of 250° C. at 45 p.s.i. for a biscuit type of product is possible. The temperatures and pressures are preferably chosen so that the net "flashes-off" its moisture content immediately on extrusion; the pressures and temperatures also determine the ultimate density of the finished net.

A further application for cereal bases relies on extruding a starch paste in such a way that little or no flash-off of moisture takes place to produce a gelatinised, relatively dense product. This, after drying, is fried in fat to produce an expanded material containing a substantial proportion of fat from the frying oil. In each of these cases, the extruder has fitted to it a net-forming die, for example a die of the type described in British Patent Specification No. 836555 or 1072113.

The method can also be applied to fat based materials such as chocolate, chocolate-like substances and fat based confections. For this application, the fat confection can be brought to the correct extrusion temperature and in the case of chocolate, tempered in the correct way to ensure good gloss and finish in the final product as in standard chocolate technology, then extruded through a temperature-controlled (e.g. at a temperature of 28° C. to 31° C.), net-forming die, starting on a cooled mandrel and then passing on to a take away belt, preferably after cutting as the material leaves the mandrel. Centre filling can also be applied as in the other confectionery cases by making use of an axial hollow mandrel passing through the extrusion head and feeding the centre filling through this. Because the set chocolate strands are fragile and difficult to handle, it is preferred and, in some cases essential, to extrude the chocolate around a mandrel formed by the centre filling (e.g. a mallow or truffle filling) so that the chocolate strands are deposited on and permanently supported by the centre filling. Thus, the chocolate need not be removed from the mandrel.

Alternatively, the net can be made from sugar base, e.g. caramel (toffee), nougat, liquorice paste, high boiled sugar, mallow, fudge, fondant and marzipan, provided that such a sugar base is extrudible.

For edible products such as caramel or nougat a gear or screw extruder can be used and extrusion take place at relatively low temperatures, although for high boiled sugar a higher temperature is used, say, in the region of 137° C.

In some cases it is essential to cool the extruded material as it leaves the die so that it maintains its shape, particularly when producing tube-like products. For this purpose cold air or nitrogen from a liquified supply can be applied. In other cases, for instance when extruding a caramel or a fondant, the extrudate can be allowed to collapse. However, in general, the mesh structure of the net will remain visible, and the net will not be collapsed or compressed to such an extent that the meshes of the net are completely closed.

The centre filling can be made by conventional confectionery manufacturing techniques and consist of two essential types:
 (a) Water based materials such as mallow, nougat, coconut paste, fudge, jelly, fondant and the like.
 (b) Fat based materials such as chocolate, chocolate-like substances, biscuit spreads, cheese spreads and the like.

In general terms, the centre filling can continuously advance along the axis of the net as the net is extruded. Though not essential in all circumstances, the centre filling is preferably extruded at substantially the same time as the net. The method of filling each of these centres into the net material can thus rely on continuously pumping or extruding the base into the formed net through a hollow tube or mandrel in the net-forming die head.

In general, it is desirable to have the centre filling, in a radial sense, as near the die orifices as possible, particularly if a centre filling is being used which does not expand much after extrusion. In order to achieve this, the net can be extruded using at least one die whose die orifices are directed towards the axis of the die, thereby placing the net onto the centre filling. It should be noted however, that this is not always necessary, depending upon the material of the net. For instance a material such as caramel could be drawn out or could shrink naturally onto the centre filling even when extruded with die orifices parallel to the axis of the die.

In general, it is desirable to support the net as it emerges from the die orifices. Depending upon the nature of the net and of the centre filling, the net may be supported at least initially by a tube or mandrel down which the centre filling advances, or may be supported, at least after a short interval, by the advancing centre filling itself. Preferably, the net is initially supported by the tube or mandrel and then by the filling until the net itself has set and becomes self-supporting, the tube or mandrel thus acting as a support for the formed net for a length of time depending on the net material and operation parameters. Many centre fillings, particularly those which are fat based, should be cooled to ensure that their temperature as a whole does not rise to such an extent that the fat melts or they become unduly soft, and to achieve this, the tube or mandrel referred to above can be cooled. None the less, it is desirable that as the filling contacts the net, the heat of the net melts a layer on the surface of the filling to effect adhesion between the filling and the net. This prevents part of the filling falling out of the net casing when the product is chewed.

The composite product of net and filling, after cooling, can then be set to whatever length is desired and can either be packed for consumption in this form or can pass to a subsequent operation, an example of which is chocolate enrobing. The unit can be covered in chocolate, chocolate-like substance and other fat based materials. It can also be coated in water based materials such as fondant icing and the like to form the finished confection or food.

Other methods of production are possible. For instance, particularly when using a cold extrusion process, the net can be cut into lengths at the extruder die faces. Such a method is particularly suitable for the subsequent production of preshaped products such as crisps by cooking, e.g. frying, between profiled forms.

In general, the food product could be specifically designed to be suitable as an animal foodstuff, but the invention is primarily directed towards food products for human consumption.

The product is preferably in the form of a snack, that is to say in the form in which it can be sold as an individual item to be held in the hand and eaten.

EXAMPLES OF PRODUCTS (a) Substantially rigid extruded tubular net of cereal-based material such as corn-based, wheat-based or rice-based material and an extruded filling of fat with cheese, milk or savoury flavouring.
(b) Substantially rigid extruded tubular net of potato-based and an extruded filling.
(c) As (a) or (b) and dipped in an onion-flavoured coating.
(d) Substantially rigid extruded tubular net of caramel with extruded filling of a mixture of peanut butter and peanuts.
(e) Substantially rigid extruded tubular net of cereal-based material, dipped in a chocolate coating.
(f) As (e), together with an extruded filling of nougat.
(g) A chocolate net which may include an edible filling such as mallow or truffle.

BRIEF DESCRIPTION OF THE DRAWINGS

The invention will be further described, by way of example, with reference to the accompanying drawings, of which:

FIGS. 1 to 6 illustrate a number of forms of the net mesh construction;

FIG. 7 is a general view of an embodiment for carrying out the invention;

FIG. 8 is a vertical section through one die head which can be used in the embodiment of FIG. 7;

FIG. 9 is a vertical section through another die head which can be used in the embodiment of FIG. 7; and FIG. 10 is a schematic view, looking on the face of a further die head which can be used in a different embodiment of the invention.

FORMS OF NET MESH CONSTRUCTION

The net mesh construction can take a variety of forms, some of which are illustrated as follows:
 FIG. 1—rotating either inner or outer die of British Patent Specification No. 836 555 whilst keeping the other die stationary;
 FIG. 2—rotating both the inner and outer dies of British Patent Specification No. 836 555;
 FIG. 3—oscillating either the inner or outer die of British Patent Specification No. 836 555 whilst keeping the outer die stationary;

FIG. 4—oscillating both the inner and outer dies of British Patent Specification No. 836 555;

FIG. 5—varying the number of slots or the pattern in which they are cut into the die of British Patent Specification No. 836 555, thereby further varying the pattern;

FIG. 6—square mesh pattern in accordance with British Patent Specification No. 1 072 113.

The products can be further varied by operating at different speeds or by oscillating by a greater or lesser amount in the case of FIGS. 3 and 4.

DETAILED DESCRIPTION OF APPARATUS AND METHOD OF THE INVENTION

The ingredients of the food product net are dry mixed in a conventional manner and are conditioned by adding moisture, and are then fed to an extruder 1, shown in FIG. 7. The specific extruder 1 may be of twin-screw design for producing high pressure and may have induction heating for producing high temperature. The extruder 1 has a die head 2 which can be generally of the type described in British Patent Specification No. 836 555.

A centre filling is made of a fat-based material, and may for example be produced by mixing a paste slurry in a conventional paddle mixer or turbine mixer, which is illustrated by a container 3 having a heated jacket 4 and provided with a mixer 5. The centre filling mix is then pumped by a pump 6 to a continuous scraped-tube heat exchanger 7 of the "Votator" type, together with gaseous nitrogen or another inert gas introduced through a duct 8. In the heat exchanger 7, the centre filling mix is whipped and cooled under pressure, e.g. 0.07 to 0.2 Kg/mm$^2$, its density being reduced approximately 1.0 to 0.6 gms/cc. The mix leaves the heat exchanger 7 via a pressure control valve 9 and passes through the extruder die head 2 in a tube or hollow mandrel 10 (see FIGS. 8 and 9) cooled down to about 4° to 5° C.

In the arrangement of FIG. 8, the tube 10 extends beyond the die head 2, and the filling expands slightly on leaving the end of the tube. The die head 2 is conventional in that it has two relatively rotatable or oscillatable annular dies 11, 12, each of which has a ring of extrusion die orifices. However, the extrusion die orifices are inclined towards the axis of the dies. The arrangement of FIG. 8 is such that the net 13 is still hot enough to slightly melt the surface of the filling 14 when the net 13 passes over the end of the tube 10 and engages the advancing filling.

In the arrangement of FIG. 9, the filling is a non-fat filling, and the tube 10 does not extend beyond the die head 2.

FIG. 10 shows the die head of an embodiment which can be used for producing flat strips of food product net. The die head has two annular dies 15, 16 each of which has a number of spaced groups of co-operating die orifices 17. The die members 15, 16 are oscillated relative to each other by for instance the distance apart of the die orifices in one die member and in one group, each group thereby producing a separate strip of net, for instance as shown in FIG. 3 or 4.

SPECIFIC EXAMPLES

Embodiments of the present invention and their methods of manufacture will now be described in the following examples where unless otherwise specified all percentages are by weight:

EXAMPLE 1

A paste consisting of:
58% potato granules
19.5% potato starch
19.5% wheat starch
3% salt is dry mixed and fed into the infeed screw of a cook screw extruder. Water is pumped into the extruder to give a total moisture of approximately 40–45% (although a moisture content in the range of 35–70% can be employed at this stage) in the resulting dough as it passes through the extruder to the die. The material passes through a die as described in British Patent No. 836 555 at a temperature of approximately 75° C. (a temperature in the range of 60° C.–100° C. can be employed) to produce a tubular net. The net thus produced is collected and cut into 15 mm lengths. At this stage the material has a moisture content of approximately 35–38% (although the moisture content can be in the range of 30–45% at this stage). The lengths of extruded net are then placed in a drying room at a temperature of 45°–50° C. for 16 hours during which time the moisture content is reduced to 7–9%. The resulting dried material is then fried in a conventional oil frier at 200°–230° C., in this Example 205° C. for 15–20 seconds to produce an expanded material (although this time could be in the range of 5–20 seconds). These are then flavoured as required by powdering the surface with a powdered flavour which generally is of a savoury nature. The resultant product is a fried and flavoured extruded snack having a novel appearance and texture and possessing good eating qualities.

EXAMPLE 2

Example 1 is repeated using a paste containing 19.5% maize starch instead of wheat starch to produce a fried and flavoured extruded snack having a novel appearance and texture and possessing good eating qualitites.

EXAMPLE 3

57% White Flour
20% Maize Grits
20% Potato Pectin Cellulose
3% Salt is mixed together and fed at room temperature into a screw extruder. The material passes through the extruder where it is heated to a temperature of approximately 175° C. (although it could be in the range of 150°–300° C.) and emerges from a net-forming die of the type described in FIGS. 1 and 2 of British Patent Specification No. 836 555 where expansion takes place as moisture is quickly released. The final moisture content is approximately 6% (although it could be 6–9%) and the resulting puffed net is sprayed with a fat and, in this Example, has a powdered flavour applied to it and then after cooling is cut to the desired length, prior to packing.

EXAMPLE 4

Example 1 is repeated using:
57% Wholemeal Flour
20% Maize Grits
20% Rolled Oats
3% Salt to produce a food product consisting of a substantially rigid tubular net.

EXAMPLE 5

Example 1 is repeated using:
57% Wholemeal Flour
16% Maize Grits
8% Milled Wheatgerm
18% Instant Potato Granules
3% Salt
to produce a food product consisting of a substantially rigid tubular net.

EXAMPLES 6 TO 8

Each of Examples 3, 4 and 5 respectively is repeated except that, immediately upon emerging from the die orifices, the extruded tubular net is filled with a fat-based material in the manner herein described with reference to FIGS. 7 and 8, whereby a filled tubular net product is produced.

A suitable fat-based material comprises:
Soft fat—28.9%
H.P.K.O.—40%
Cheese Powder—20%
Milk powder (skimmed or full cream)—10%
Salt—1%
Flavour enhancer—0.1%

The use of a fat-based material is preferred because it is compatible with the tubular net which is cereal based. Water-based filling material is not preferred as moisture transfer can take place which tends to soften the net and make the food product less desirable.

In Examples 6 to 8, the resultant food product is a length of cereal-based tubular net filled with a fat-based material. The product has a novel appearance and provides a pleasing contrast in taste and texture between the net and the filling.

EXAMPLE 9

A caramel made, in a conventional manner, to the following recipe (parts by weight).
Glyceryl Monostearate—0.326
Trisodium Citrate—0.776
Skimmed Sweetened Condensed Milk—12.674
Whey Powder—17.557
42DE Glucose—42.657
Granulated Sugar—16.941
HPKO—13.320
Salt—0.419
Ethyl Vanillin—0.005
Isopropyl Alcohol—0.035
Butter Flavour—0.181
Egg Albumen Powder—0.171
Calcium Lactate Anhydrous—0.017
Water—6.000
is cooled to approximately 45°–60° C. and fed to a conventional gear or screw extruder. This forces the material through a net-forming die which continuously produces a tubular net of caramel. This is supported for approximately 15 cms on a mandrel which is coated with a suitable anti-stick material such as polytetrafluoroethylene, and the caramel tube is then cooled rapidly with either cold air or spray liquid nitrogen before passing onto a band which takes the tube through a conventional recirculated air cooler. After this it is cut to the desired length and passed directly to a conventional chocolate enrober where the lengths of extruded caramel net are covered with chocolate or a chocolate-like substance. In some instances, the chocolate or chocolate-like substance may be sprayed onto the tube as it leaves the first air cooler.

EXAMPLE 10

Example 9 is repeated except that the tubular net of caramel is filled with a mallow composition as it emerges from net-forming die. The mallow composition is fed through a hollow mandrel passing through the extruder. In this Example, the mallow composition is produced, using a high boiled sugar syrup comprising, in parts by weight,
Granulated Sugar—46.841
42DE Glucose Syrup—29.306
Invert Sugar Syrup—12.136
230° Bloom Gelatine—2.385
Vanilla Flavour—0.208
Water—16.000

The mallow is produced continuously on a conventional plant by dissolving egg albumen in water and incorporating this with the high boiled sugar syrup which subsequently passes to a continuous machine of the rotary type which reduces the density to 0.2–0.6 gms/cc before discharging the mallow through the mandrel into the centre of the caramel net. The mallow acts as a support for the caramel net to prevent it collapsing and the combined material passes on a belt through a cooler with air circulation before passing to a cutting operation to cut the units to the required length and then into a subsequent conventional chocolate coating operation.

EXAMPLE 11

A milk chocolate composition having the following ingredients:
Sugar—46.29%
Cocoa Solids—5.21%
Non-Fat Milk Solids—18.99%
Milk Fat—7.94%
Cocoa Butter—21.37%
Lecithin—0.2%
is manufactured in a manner known per se. After tempering, the chocolate composition is passed to a net-forming die of the type disclosed in FIGS. 6, 7 and 8 of British Patent Specification No. 836 555. The temperature of the composition is 28°–31° C. and the composition has viscosity properties at this temperature which enable it to be extruded. Immediately after emerging from the die, the resultant integrally extruded planar net of milk chocolate is cooled to 15°–20° C. by an air blast and is fed on to a moving band conveyor to be cut to length and packed. The resultant product is a length of milk chocolate net which gives an immediate flavour of chocolate upon tasting in view of its easy melting qualities in the form provided.

EXAMPLE 12

Example 11 is repeated using a dark chocolate composition having the following ingredients:
Sugar—58.4%
Cocoa Mass—32.95%
Hardened Fat—3.27%
Dairy Butter—4.0%
Lecithin—1.38%
to produce lengths of planar, integrally extruded net formed of dark chocolate.

EXAMPLE 13

Using the milk chocolate composition of Example 11, a tubular net was formed by extruding the composition at a temperature of 28° to 31° C. through a tubular net-forming die. Simultaneously, a centre filling of the mallow composition of Example 10 was extruded within the net-forming die to produce a solid mandrel of mallow upon which the extruded strands of chocolate were laid and permanently support. Upon emerging from the die, the tubular milk chocolate net and filling was cooled to 15°–20° C. and then cut into lengths. The resultant product was of novel and pleasing appearance and had an unusual and eminently acceptable texture.

EXAMPLE 14

Example 13 was repeated using the dark chocolate composition of Example 12 to form a product which was similar to that obtained in Example 13.

It is also within the scope of the present invention to provide a food product which includes more than one net. For example, with a suitable arrangement of dies in the net-forming apparatus, it is possible to produce two or more concentric edible tubular nets or two or more overlapping planar or curved nets. In the case of two or more concentric edible tubular nets, the filling, if present will normally be disposed inside the inner or innermost tubular net. The nets may be formed of the same or different edible materials.

It is to be appreciated that, where the food product comprises more than one component, the consistencies and flavours of the components will be chosen so as to be mutually compatible. Thus, for example, a relatively bland, subsrtantially fat-free cereal net can be combined with a fatty filling or coating, or a fatty net can be combined with a relatively bland filling or coating.

We claim:

1. A composite food product consisting essentially of:
   (1) a tube whose wall is composed of a net having mesh strands and intersections which are integrally formed of a first edible material by an extrusion process; and
   (2) a filling of a second edible material within the tube and in contact with an inner surface of the tube wall, wherein the edible material forming the net is a material based on one or more of the group consisting of cereal and potato.

2. The composite food product according to claim 1, wherein the tube is substantially rigid and completely surrounds the filling in the circumferential direction of the tube so as to support the latter.

3. The composite food product according to claim 1, wherein the filling acts as a support for said tube.

4. The composite food product according to claim 1, wherein the filling is a water-based edible material.

5. The composite food product according to claim 1, wherein the filling is a fat-based edible material.

6. A composite food product sonsisting essentially of:
   (1) a tube whose wall is composed of a net having mesh strands and intersections which are integrally formed of a first edible material by an extrusion process; and
   (2) a filling of a second edible material within the tube and in contact with an inner surface of the tube wall,, wherein the edible material forming the net is a fat-based material.

7. A composite food product consisting essentially of:
   (1) a tube whose wall is composed of a net having mesh strands and intersections which are integrally formed of a first edible material by an extrusion process; and
   (2) a filling of a second edible material within the tube and in contact with an inner surface of the tube wall,, wherein the edible material forming the net is a sugar-based material.

8. The composite food product according to claim 1, wherein the net is one that has been extruded from an extrusion apparatus which cooks the edible material.

9. The composite food product according to claims 1 or 8 wherein the net is one which has been fried after extrusion.

10. The composite food product according to claim 8, wherein the net is of expanded edible material having a moisture content of 2 to 8% by weight.

11. The composite food product according to claim 6, wherein the edible material is chocolate.

12. The composite food product according to claim 7, wherein the edible material is caramel or fudge.

13. The composite food product according to claim 1, wherein the tube is coated with a third edible material.

14. A composite food product consisting essentially of (1) a tube whose wall is composed of a net of a first edible material selected from the group consisting of cereal-based materials, potato-based materials, cereal and potato-based materials, fat-based materials and sugar-based materials, said net having mesh strands which extend generally longitudinally of the tube, and other mesh strands which join together the generally longitudinally extending mesh strands so as to define intersections where the two sets of the strands are joined, said strands and intersections being integrally formed of said edible material by a single extrusion process, and (2) a filling of a second edible material selected from the group consisting of a water-based materials and fat-based materials, said filling being within said tube and in contact with an inner surface of the tube wall, said tube being substantially rigid and completely surrounding the filling in the circumferential direction so as to support the latter.

15. The composite food product according to claim 11, wherein said edible material forming said net is selected from the group consisting of cereal-based materials, potato-based materials and cereal and potato-based materials, wherein said edible material is an expanded edible material having a moisture content of 2 to 8% by weight, and wherein the edible material forming said filling is a fat-based material.

16. The composite food product according to claim 11, wherein said tube is coated with a third edible material.

17. A method of making a composite food product comprising the steps of extruding a first edible material through die orifices so as to produce a tube whose wall is composed of a net having mesh strands and intersections which are integrally formed of said edible material, and providing a filling of a second edible material in the tube so that the filling contacts an inner surface of the tube wall, wherein said edible material forming the net is at least one of a cereal or potato-based material and the extrusion of such material is effected under high pressure and temperature so that a rapid evaporation of moisture takes place to produce a net of expanded edible material.

18. The method according to claim 17, wherein the moisture content of the net shortly after extrusion is such that no substantial drying is subsequently required.

19. The method according to claim 18, wherein the extrusion is effected so that the material loses moisture immediately on extrusion.

20. A method of making a composite food product comprising the steps of extruding a first edible material through die orifices so as to produce a tube whose wall is composed of a net having mesh strands and intersections which are integrally formed of said material, and providing a filling of a second edible material in the tube so that the filling contacts an inner surface of the tube wall,, wherein the net tube is formed of a starch-based paste and little or no flash-off of moisture takes place on extrusion, the extrusion producing a gelatinized, relatively dense product which is dried, and then fried in fat to produce an expanded material.

21. A method of making a composite food product comprising the steps of extruding a first edible material through die orifices so as to produce a tube whose wall is composed of a net having mesh strands and intersections which are integrally formed of said edible material, and providing a filling of a second edible material in the tube so that the filling contacts an inner surface of the tube wall,, wherein the second edible material is fed into the net tube as it is extruded.

22. The method according to claim 21, wherein the first and second edible materials are simultaneously extruded through a common multi-orifice die, the first edible material through at least two outer orifices directed towards the axis of the die, the second edible material through a central orifice or mandrel located on the axis of the die, thereby placing the net tube of the first edible material onto the second edible material.

23. The method according to claim 21, wherein the net tube is supported, at least after a short interval, by the second edible material until the net tube has set and becomes self-supporting.

24. The method according to claim 23, wherein the net is initially supported by a tube or hollow mandrel, and then by the filling.

25. The method according to claim 21, wherein, as the filling contacts the net, the heat of the net melts a layer on the surface of the filling to effect adhesion between the filling and the net.

26. A method of making a composite food product comprising the steps of extruding a first edible material through die orifices so as to produce a tube whose wall is composed of a net having mesh strands and intersections which are integrally fromed of said edible material, and providing a filling of a second edible material in the tube so that that the filling contacts an inner surface of the tube wall,, wherein the net tube is further coated with a third edible material.

27. The composite food product according to claim 10 or 15, wherein the net has a moisture content of 4 to 8% by weight.

28. The composite food product consisting essentially of the food product of claims 1 or 14, wherein a second net of an edible material is formed around the first net.

29. A method of making a composite food product comprising the steps of extruding a first edible material through die orifices so as to produce a tube whose wall is composed of a net having mesh strands and intersections which are integrally formed of said edible material, and providing a filling of a second edible material in the tube so that the filling contacts an inner surface of the tube wall, wherein a second net of an edible material is formed around the first net.

30. The composite food product according to claims 1 or 14, wherein the first edible material is substantially rigid and is corn-based, wheat-based, or rice-based and the second edible material is fat-based and is cheese, milk or savory flavored.

31. The composite food product according to claim 30, wherein the product is further coated with an onion flavored coating.

32. The composite food product according to claims 1 or 14, wherein the first edible material is substantially rigid and potato-based, and the product is further coated with an onion flavored coating.

33. The composite food product according to claims 1 or 14, wherein the first edible material is substantially rigid and is caramel and the second edible material is a mixture of peanut butter and peanuts.

34. The composite food product according to claims 1 or 14, wherein the first edible material is substantially rigid and is cereal-based, and the product is further coated with a chocolate coating.

35. The composite food product according to claim 34, wherein the second edible material is nougat.

36. The composite food product according to claims 1 or 14, wherein the first edible material is chocolate and the second edible material is mallow or truffle.

37. The composite food product according to claim 8, wherein the net is of expanded edible material having a moisture content of 6 to 9% by weight.

38. The composite food product according to claim 14, wherein said edible material forming said net is selected from the group consisting of cereal-based materials, potatoe-based materials and cereal and potato-based materials, wherein said edible material is an expanded edible material having a moisture content of 6 to 9% by weight, and wherein the edible material forming said filling is a fat-based material.

* * * * *